United States Patent
Julier et al.

(10) Patent No.: US 8,825,987 B2
(45) Date of Patent: Sep. 2, 2014

(54) INSTRUCTION AND LOGIC FOR PROCESSING TEXT STRINGS

(71) Applicant: Intel Corporation, Santa Clara, CA (US)

(72) Inventors: Michael A. Julier, Los Gatos, CA (US); Jeffrey D. Gray, Portland, OR (US); Srinivas Chennupaty, Portland, OR (US); Sean P. Mirkes, Beaverton, OR (US); Mark P. Seconi, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/721,819

(22) Filed: Dec. 20, 2012

(65) Prior Publication Data

US 2013/0124827 A1     May 16, 2013

Related U.S. Application Data

(63) Continuation of application No. 13/721,725, filed on Dec. 20, 2012, which is a continuation of application No. 13/164,715, filed on Jun. 20, 2011, which is a continuation of application No. 11/525,981, filed on Sep. 22, 2006.

(51) Int. Cl.
*G06F 9/30*        (2006.01)
*G06F 9/38*        (2006.01)
*G06F 9/34*        (2006.01)

(52) U.S. Cl.
CPC .............. *G06F 9/30* (2013.01); *G06F 9/30029* (2013.01); *G06F 9/30021* (2013.01); *G06F 9/30036* (2013.01); *G06F 9/3887* (2013.01); *G06F 9/3885* (2013.01); *G06F 9/34* (2013.01); *G06F 9/3824* (2013.01)
USPC .......................................................... 712/22

(58) Field of Classification Search
CPC ....................................................... G06F 9/30
See application file for complete search history.

(56) References Cited

U.S. PATENT DOCUMENTS

| | | | |
|---|---|---|---|
| 4,949,238 | A | 8/1990 | Kamiya |
| 5,125,092 | A | 6/1992 | Prener |
| 5,210,833 | A | 5/1993 | Kaneko |
| 5,237,666 | A | 8/1993 | Suzuki et al. |
| 5,268,995 | A | 12/1993 | Diefendorff et al. |
| 5,519,649 | A | 5/1996 | Takahashi |
| 5,555,428 | A | 9/1996 | Radigan et al. |

(Continued)

FOREIGN PATENT DOCUMENTS

WO       2008036945 A1     3/2008

OTHER PUBLICATIONS

Hammond, L., etal., A Single-Chip Multiprocessor, 1997, IEEE, pp. 79-85.*

(Continued)

*Primary Examiner* — Eric Coleman
(74) *Attorney, Agent, or Firm* — Mnemoglyphics, LLC; Lawrence M. Mennemeier

(57) ABSTRACT

Methods, apparatus, and instructions for performing string comparison operations. An apparatus may include execution resources to execute a first instruction. In response to the first instruction, said execution resources store a result of a comparison between each data element of a first and second operand corresponding to a first and second text string, respectively.

20 Claims, 12 Drawing Sheets

(56) References Cited

U.S. PATENT DOCUMENTS

| | | | |
|---|---|---|---|
| 5,604,910 | A | 2/1997 | Kojima et al. |
| 5,619,715 | A | 4/1997 | Dinkjian et al. |
| 5,634,119 | A | 5/1997 | Emma et al. |
| 5,717,952 | A | 2/1998 | Christiansen et al. |
| 5,761,470 | A | 6/1998 | Yoshida |
| 5,778,241 | A | 7/1998 | Bindloss et al. |
| 5,819,101 | A | 10/1998 | Peleg et al. |
| 5,991,874 | A | 11/1999 | Mills et al. |
| 5,995,746 | A * | 11/1999 | Sites et al. ............... 712/220 |
| 6,131,092 | A | 10/2000 | Masand |
| 6,282,628 | B1 | 8/2001 | Dubey et al. |
| 6,377,970 | B1 | 4/2002 | Abdallah et al. |
| 6,421,696 | B1 | 7/2002 | Horton |
| 6,470,440 | B1 | 10/2002 | Nguyen et al. |
| 7,003,653 | B2 * | 2/2006 | Spracklen ............... 712/300 |
| 7,315,935 | B1 * | 1/2008 | Alsup et al. ............. 712/214 |
| 7,472,258 | B2 * | 12/2008 | Burky et al. ............. 712/218 |
| 7,594,099 | B2 * | 9/2009 | Tanaka et al. ........... 712/223 |
| 7,676,647 | B2 * | 3/2010 | Codrescu et al. ............ 712/2 |
| 7,793,084 | B1 * | 9/2010 | Mimar ..................... 712/236 |
| 7,861,071 | B2 * | 12/2010 | Wilson ..................... 712/234 |
| 8,185,666 | B2 * | 5/2012 | Chauvel ....................... 710/1 |
| 8,289,335 | B2 * | 10/2012 | Hansen et al. ............ 345/522 |
| 2001/0022792 | A1 | 9/2001 | Maeno et al. |
| 2003/0167460 | A1 | 9/2003 | Desai et al. |
| 2004/0078556 | A1 | 4/2004 | Spracklen |
| 2005/0125647 | A1 | 6/2005 | Symes et al. |
| 2005/0138005 | A1 | 6/2005 | Roux et al. |
| 2005/0172210 | A1 | 8/2005 | Sheaffer |
| 2005/0251644 | A1 | 11/2005 | Maher et al. |
| 2005/0289299 | A1 | 12/2005 | Nunamaker et al. |

OTHER PUBLICATIONS

Olukotun, K., etal., The Case for a Single-Chip Multiprocessor, 1996, ACM, pp. 2-11.*

1A-32 Intel Architecture Software Developer's Manual, vol. 2A; Instruction Set Reference, A-M, Sep. 2005, 744 pages, Order No. 253666-017.

Kamigata et al., "Proposal of Data-Driven Processor Architecture QV-K1" in Proceedings, Ninth Great Lakes Symposium on VLSI, Ann Arbor; IEEE Computer Society, 1999, 2 pages.

International Search Report; International Application No. PCT/US2007/079234; mailed Jan. 16, 2008, 2 pages.

R.M. Ramanathan, et al., "Extending the World's Most Popular Processor Architecture," New Innovations That Improve the Performance and Energy Efficiency of Intel Architecture, 2006, 8 pages.

Anderew S. Tanenbaum, "Structured Computer Organization," Prentice-Hall, 2nd Edition, 1984, 5 pages.

Peleg et al., "Intel MMX for Multimedia PC's," Communications of the ACM, vol. 40, No. 1, Jan. 1997, 14 pages.

Ruby B. Lee, "Multimedia Extensions for General Purpose Processors," 1997, 15 pages, IEEE.

Greenley, D. et al., "Ultra SPARC: The Next Generation Superscalar 64 bit SPARC," 1995, IEEE, pp. 442-451.

Zhou, Jingren et al., "Implementing Database Operations Using SIMD Instructions," 2002, ACM, pp. 145-156.

Bik, Aart J.C., et al., "Automatic Intra-Register Vectorizaton for Intel Architecture," 2002, International Journal of Programming, vol. 30 pp. 65-98.

Carmen, D., "Inside the Pentium 4 Processor Micro-Architecture Next Generation 1A-32 Micro-Architecture," Aug. 2000, 45 pages. (slides).

Wozniak, A. "Using Video-Oriented Instructions to Speed Up Sequence Comparison," 1997, CABIOS, vol. 13, No. 2, pp. 145-150.

Cheong, G. et al., "An Optimizer for Multimedia Instruction Sets (A Preliminary Report)," Aug. 1997, Stanford University, 12 pages.

Schmookler, Martin S. et al., "A Low-Power, High-speed Implementation of a PowerPC Microprocessor Vector Extension," 1999, 14th IEEE Symposium on Computer Arithmetic, 8 pages.

* cited by examiner

| 127 | 120 119 | 112 111 | 104 103 | | | | 24 23 | 16 15 | 8 7 | 0 |
|---|---|---|---|---|---|---|---|---|---|---|
| bbbb bbbb | bbbb bbbb | bbbb bbbb | • | • | • | bbbb bbbb | bbbb bbbb | bbbb bbbb |

UNSIGNED PACKED BYTE REPRESENTATION 344

| 127 | 120 119 | 112 111 | 104 103 | | | | 24 23 | 16 15 | 8 7 | 0 |
|---|---|---|---|---|---|---|---|---|---|---|
| sbbb bbbb | sbbb bbbb | sbbb bbbb | • | • | • | sbbb bbbb | sbbb bbbb | sbbb bbbb |

SIGNED PACKED BYTE REPRESENTATION 345

| 127 | 112 111 | | | | 16 15 | 0 |
|---|---|---|---|---|---|---|
| wwww wwww wwww wwww | • | • | • | wwww wwww wwww wwww |

UNSIGNED PACKED WORD REPRESENTATION 346

| 127 | 112 111 | | | | 16 15 | 0 |
|---|---|---|---|---|---|---|
| swww wwww wwww wwww | • | • | • | swww wwww wwww wwww |

SIGNED PACKED WORD REPRESENTATION 347

| 127 | | 92 91 | 32 31 | 0 |
|---|---|---|---|---|
| dddd dddd dddd dddd dddd dddd dddd dddd | • • • | dddd dddd dddd dddd dddd dddd dddd dddd |

UNSIGNED PACKED DOUBLEWORD REPRESENTATION 348

| 127 | | 92 91 | 32 31 | 0 |
|---|---|---|---|---|
| sddd dddd dddd dddd dddd dddd dddd dddd | • • • | sddd dddd dddd dddd dddd dddd dddd dddd |

SIGNED PACKED DOUBLEWORD REPRESENTATION 349

FIG. 3C

| 31 | 28 27 | 24 23 | 22 21 | 20 19 | 16 15 | 12 11 | 8 7 | 5 4 | 3 0 |
|---|---|---|---|---|---|---|---|---|---|
| Cond 381 | Op 382 | Size 383 | Sat 384 | Src 385 | Dest 386 | Op 387 | Op 388 | Op 389 | Src 390 |

INSTRUCTION AND LOGIC FOR PROCESSING TEXT STRINGS

CLAIM TO PRIORITY

This is a continuation of U.S. patent application Ser. No. 13/721,725, entitled, "Instruction And Logic For Processing Text Strings" filed Dec. 20, 2012, which is a continuation of U.S. patent application Ser. No. 13/164,715, entitled, "Instruction And Logic For Processing Text Strings" filed Jun. 20, 2011, which is a continuation of U.S. patent application Ser. No. 11/525,981, filed Sep. 22, 2006, which is hereby incorporated by reference in its entirety into this application.

FIELD OF THE DISCLOSURE

The present disclosure pertains to the field of processing apparatuses and associated software and software sequences that perform logical and mathematical operations.

BACKGROUND OF THE DISCLOSURE

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

As processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Communications applications have been driving microprocessor development for more than a decade. In fact, the line between computing and communication has become increasingly blurred due, in part, to the use of textual communication applications. Textual applications are pervasive within consumer segments, and among numerous devices, from cell phones to personal computers, requiring faster and faster processing of text information. Textual communication devices continue to find their way into computing and communication devices in the form of applications, such as Microsoft® Instant Messenger™, email applications, such as Microsoft® Outlook™, and cell phone texting applications. As a result, tomorrow's personal computing and communications experience will be even richer in textual capability.

Accordingly, the processing or parsing of text information communicated between computing or communication devices has become increasingly important for current computing and communication devices. Particularly, interpretation by a communication or computing device of strings of text information include some of the most important operations performed on text data. Such operations may be computationally intensive, but offer a high level of data parallelism that can be exploited through an efficient implementation using various data storage devices, such as for example, single instruction multiple data (SIMD) registers. A number of current architectures also require multiple operations, instructions, or sub-instructions (often referred to as "micro-operations" or "uops") to perform various logical and mathematical operations on a number of operands, thereby diminishing throughput and increasing the number of clock cycles required to perform the logical and mathematical operations.

For example, an instruction sequence consisting of a number of instructions may be required to perform one or more operations necessary to interpret particular words of a text string, including comparing two or more text words represented by various datatypes within a processing apparatus, system or computer program. However, such prior art techniques may require numerous processing cycles and may cause a processor or system to consume unnecessary power in order to generate the result. Furthermore, some prior art techniques may be limited in the operand datatypes that may be operated upon.

BRIEF DESCRIPTION OF THE DRAWINGS

The present invention is illustrated by way of example and not limitation in the Figures of the accompanying drawings:

FIG. 3C illustrates various signed and unsigned packed data type representations in multimedia registers according to one embodiment of the present invention;

FIG. 3D illustrates one embodiment of an operation encoding (opcode) form at;

FIG. 3F illustrates yet another alternative operation encoding format;

DETAILED DESCRIPTION

Figure 1A:
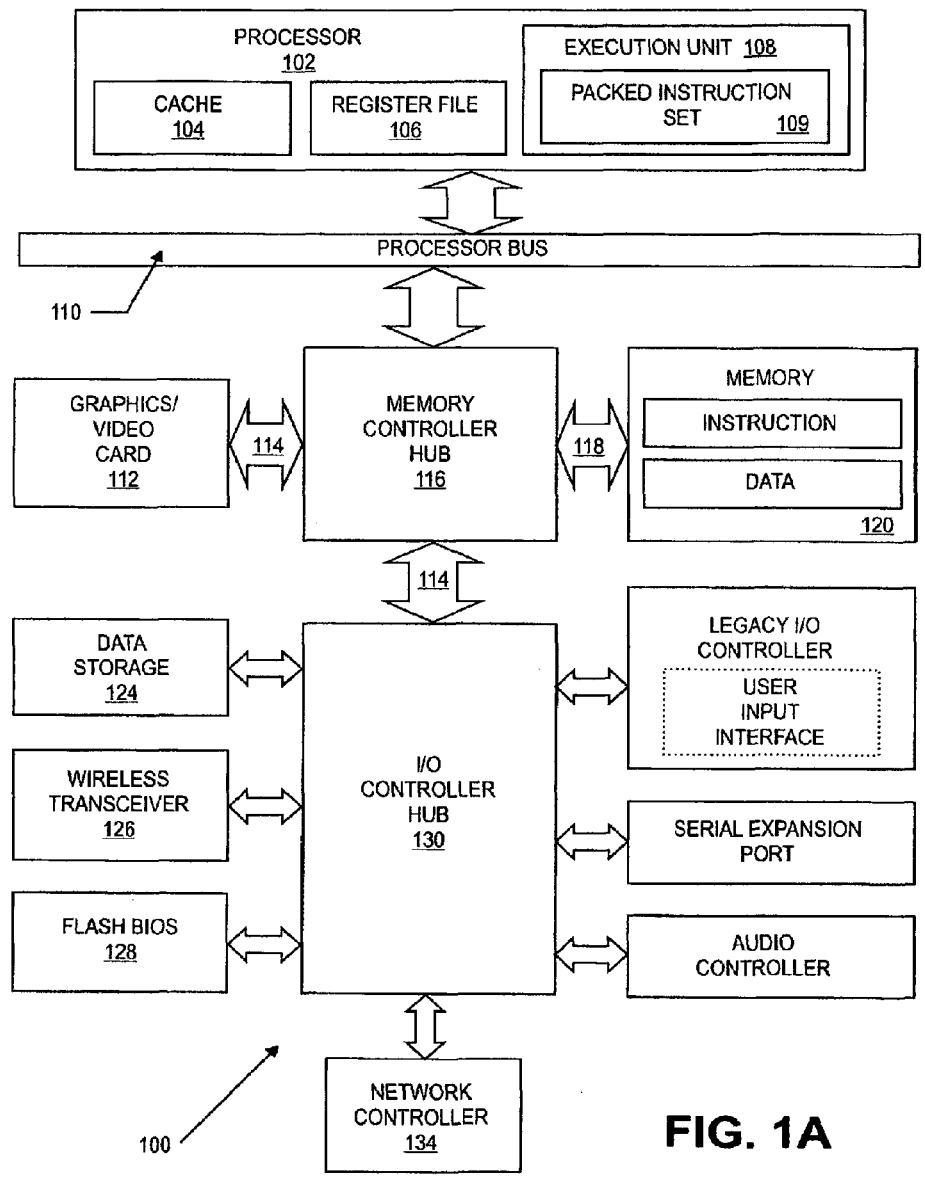
FIG. 1A is a block diagram of a computer system formed with a processor that includes execution units to execute an instruction for string comparison operations in accordance with one embodiment of the present invention.

The following description describes embodiments of a technique to perform a comparison operation between text or string elements within a processing apparatus, computer system, or software program. In the following description, numerous specific details such as processor types, microarchitectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. However, the present invention is not limited to processors or machines that perform 256 bit, 128 bit, 64 bit, 32 bit, or 16 bit data operations and can be applied to any processor and machine in which manipulation of packed data is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

Although the below examples describe instruction handling and distribution in the context of execution units and logic circuits, other embodiments of the present invention can be accomplished by way of software. In one embodiment, the methods of the present invention are embodied in machine-executable instructions. The instructions can be used to cause a general-purpose or special-purpose processor that is programmed with the instructions to perform the steps of the present invention. The present invention may be provided as a computer program product or software which may include a machine or computer-readable medium having stored thereon instructions which may be used to program a computer (or other electronic devices) to perform a process according to the present invention. Alternatively, the steps of the present invention might be performed by specific hardware components that contain hardwired logic for performing the steps, or by any combination of programmed computer components and custom hardware components. Such software can be stored within a memory in the system. Similarly, the code can be distributed via a network or by way of other computer readable media.

Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infra-red signals, digital signals, etc.) or the like. Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

A design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

In modem processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet, text, and multimedia applications, additional processor support has been introduced over time. For instance, Single Instruction, Multiple Data (SIMD) integer/floating point instructions and Streaming SIME Extensions (SSE) are instructions that reduce the overall number of instructions required to execute a particular program task, which in turn can reduce the power consumption. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Presently a SIMD instruction that compares each data element of at least two packed operands is not available. Without the presence of a SIMD packed comparison instruction, such as that performed by one embodiment, a large number of instructions and data registers may be needed to accomplish the same results in applications such as text interpretation, compression/de-compression, processing, and manipulation. Embodiments disclosed herein make reference to text or string comparisons interchangeably. However, embodiments may be applied to any string of information (text, numbers, or other data).

Thus, at least one string compare instruction in accordance with embodiments of the present invention can reduce code overhead and resource requirements. Embodiments of the present invention provide a way to implement a text parsing operation as an algorithm that makes use of SIMD related hardware. Presently, it is somewhat difficult and tedious to perform text parsing operations on data in a SIMD register. Some algorithms require more instructions to arrange data for arithmetic operations than the actual number of instructions to execute those operations. By implementing embodiments of text comparison operations in accordance with embodiments of the present invention, the number of instructions needed to achieve text processing can be drastically reduced.

Embodiments of the present invention involve an instruction for implementing one or more string comparison operations. A text comparison operation generally involves comparing data elements from two strings of data to determine which data elements match. Other variations may be made on the generic text comparison algorithm, which will be discussed herein. In a generalized sense, one embodiment of a text comparison operation as applied to individual data elements in two packed operands representing two strings of data can be generically represented as:

DEST1←SRC1 cmp SRC2;

For a packed SIMD data operand, this generic operation can be applied to each data element position of each operand.

In the above operation, "DEST" and "SRC" are generic terms to represent the destination and source of the corresponding data or operation. In some embodiments, they may be implemented by registers, memory, or other storage areas having other names or functions than those depicted. For example, in one embodiment, DEST1 may be a temporary storage register or other storage area, whereas SRC1 and SRC2 may be a first and second source storage register or other storage area, and so forth. In other embodiments, two or more of the SRC and DEST storage areas may correspond to different data storage elements within the same storage area (e.g., a SIMD register).

Furthermore, in one embodiment, a string comparison operation may generate an indicator of whether each element of one of the source registers is equal to each element of the other source register and store the indicator into a register, such as DEST1. In one embodiment, the indicator is an index value, whereas in other embodiments the indicator may be a mask value. In other embodiments, the indicator may represent other data structures or pointers.

FIG. 1A is a block diagram of an exemplary computer system formed with a processor that includes execution units to execute an instruction for a string comparison operation in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM™ 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention is not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs string comparison operations on operands. Furthermore, some architectures have been-implemented to enable instructions to operate on several data simultaneously to improve the efficiency of multimedia applications. As the type and volume of data increases, computers and their processors have to be enhanced to manipulate data in more efficient methods.

FIG. 1A is a block diagram of a computer system 100 formed with a processor 102 that includes one or more execution units 108 to perform an algorithm to compare data elements from one or more operands in accordance with one embodiment of the present invention. One embodiment may be described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a packed instruction set 109. In one embodiment, the packed instruction set 109 includes a packed string comparison instruction for comparing elements of a number of operands. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute an algorithm with a string comparison instruction can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
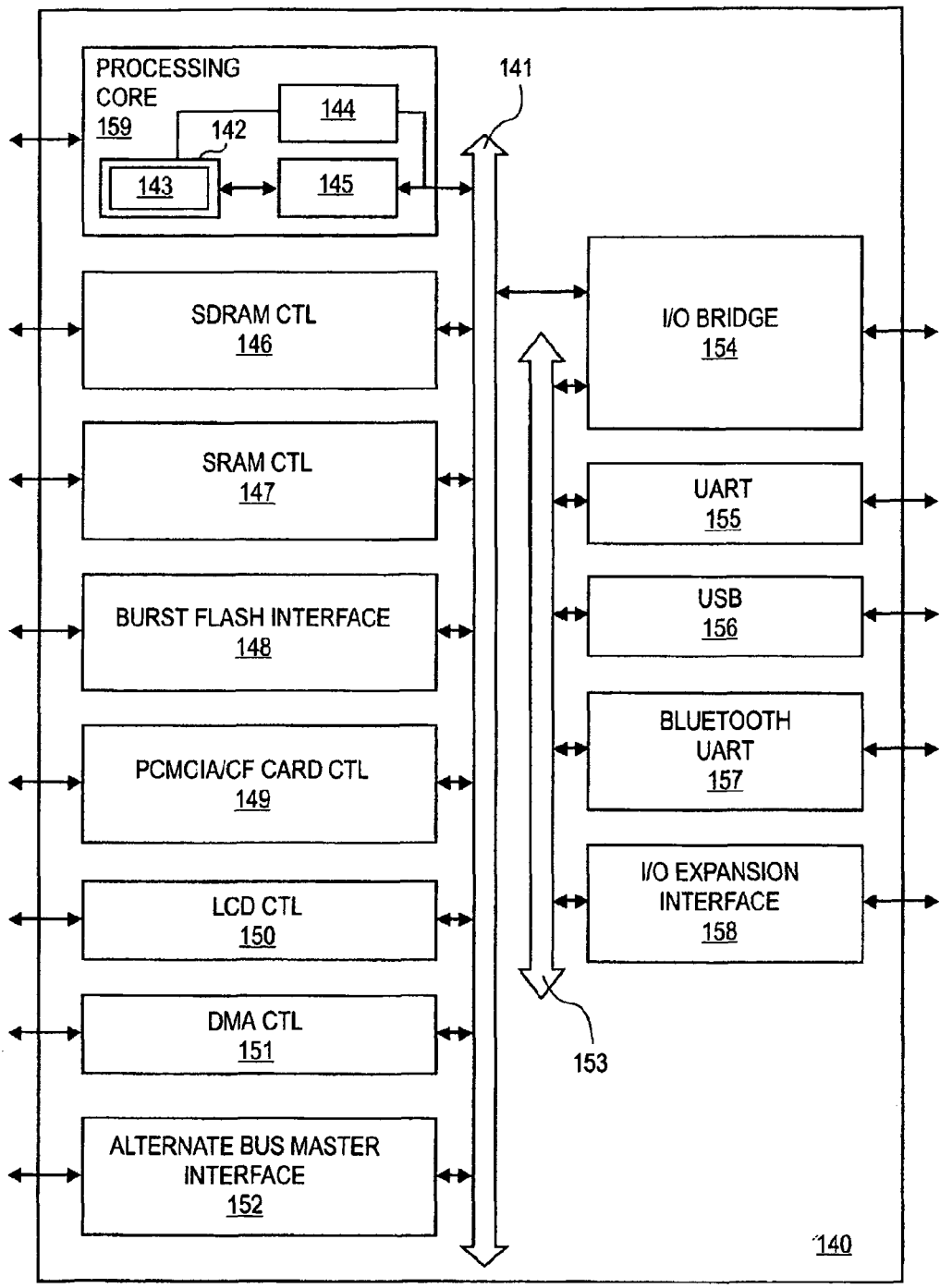
FIG. 1B is a block diagram of another exemplary computer system in accordance with an alternative embodiment of the present invention.

FIG. 1B illustrates a data processing system 140 which implements the principles of one embodiment of the present invention. It will be readily appreciated by one of skill in the art that the embodiments described herein can be used with alternative processing systems without departure from the scope of the invention.

Computer system 140 comprises a processing core 159 capable of performing SIMD operations including a string comparison operation. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize instructions in packed instruction set 143 for performing operations on packed data formats. Packed instruction set 143 includes instructions for supporting string comparison operations, and may also include other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
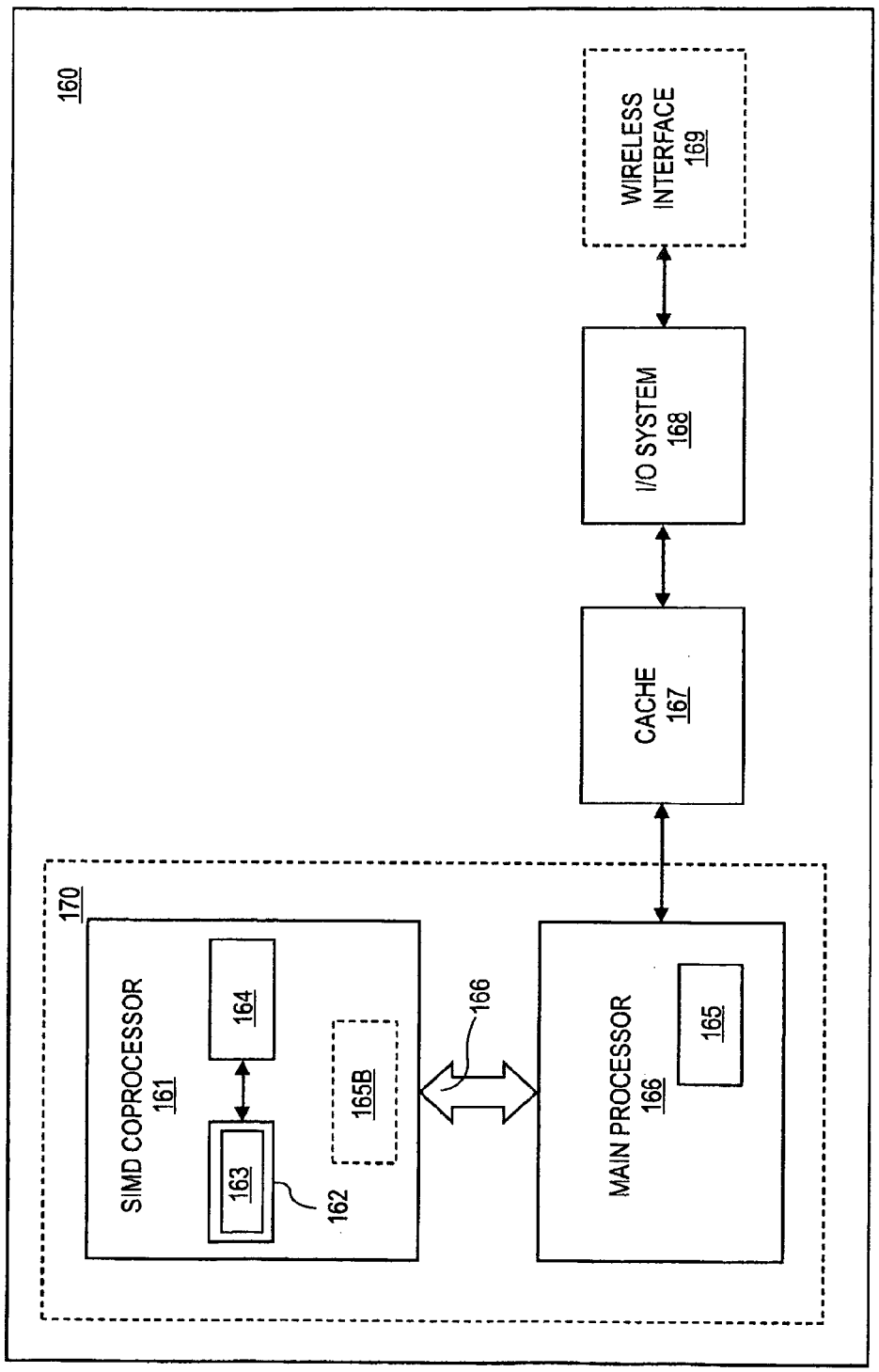
FIG. 1C is a block diagram of yet another exemplary computer system in accordance with another alternative embodiment of the present invention.

FIG. 1C illustrates yet another alternative embodiments of a data processing system capable of performing SIMD string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing SIMD operations including string comparison operations. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including SIMD string comparison instructions for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including SIMD string comparison instructions.

Figure 2:
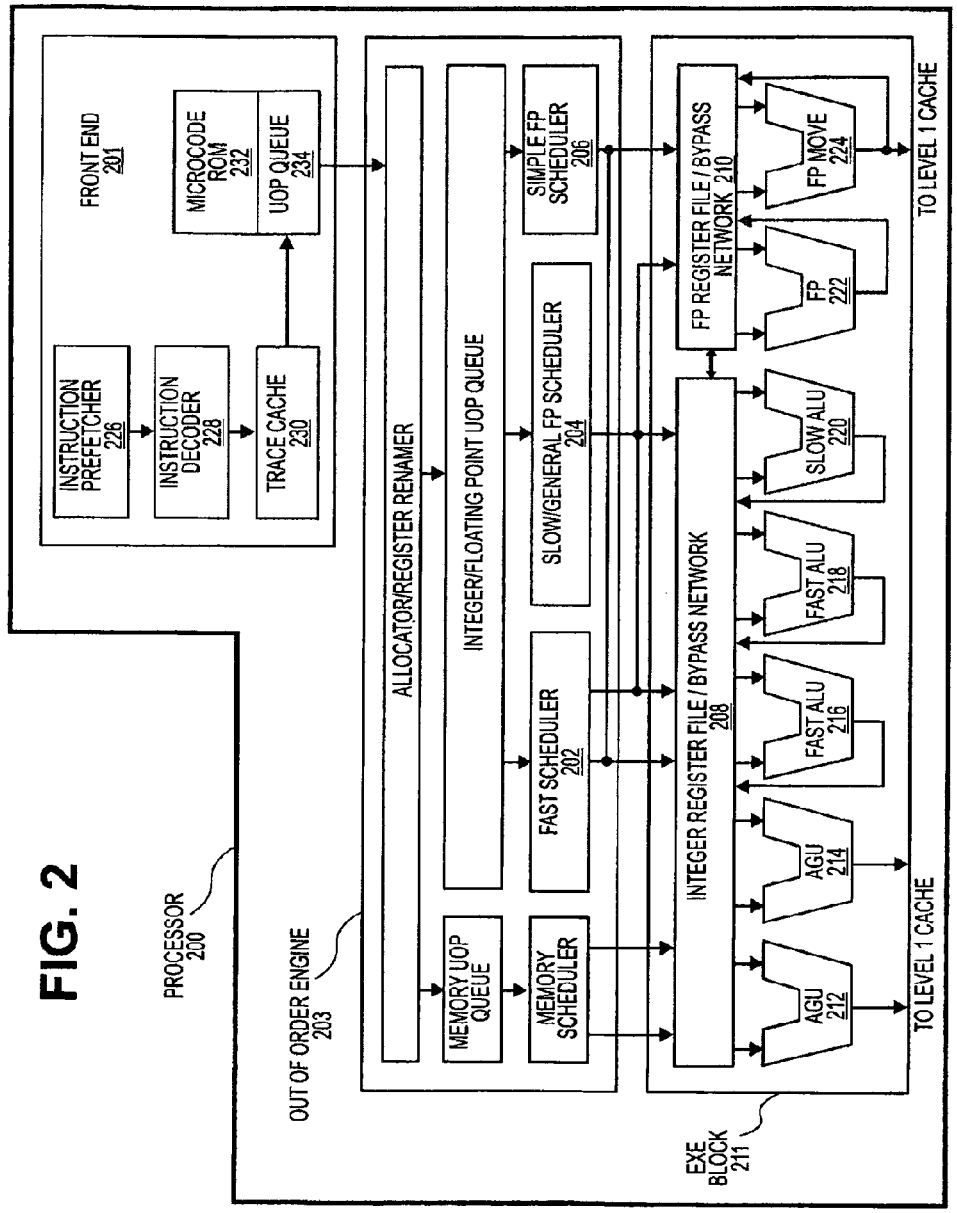
FIG. 2 is a block diagram of the micro-architecture for a processor of one embodiment that includes logic circuits to perform one or more string comparison operations in accordance with the present invention.

FIG. 2 is a block diagram of the micro-architecture for a processor 200 that includes logic circuits to perform a string comparison instruction in accordance with one embodiment of the present invention. For one embodiment of the string comparison instruction, the instruction can compare each data element of a first operand with each data element of a second operand and store an indicator of whether there is a match for each comparison. In some embodiments, the string comparison instruction can be implemented to operate on data elements having sizes of byte, word, doubleword, quadword, etc., and datatypes, such as integer and floating point datatypes In one embodiment the in-order front end 201 is the part of the processor 200 that fetches macro-instructions to be executed and prepares them to be used later in the processor pipeline. The front end 201 may include several units. In one embodiment, the instruction prefetcher 226 fetches macro-instructions from memory and feeds them to an instruction decoder 228 which in turn decodes them into primitives called micro-instructions or micro-operations (also called micro op or uops) that the machine can execute. In one embodiment, the trace cache 230 takes decoded uops and assembles them into program ordered sequences or traces in the uop queue 234 for execution. When the trace cache 230 encounters a complex macro-instruction, the microcode ROM 232 provides the uops needed to complete the operation.

Many macro-instructions are converted into a single micro-op, whereas others need several micro-ops to complete the full operation. In one embodiment, if more than four micro-ops are needed to complete a macro-instruction, the decoder 228 accesses the microcode ROM 232 to do the macro-instruction. For one embodiment, a packed string comparison instruction can be decoded into a small number of micro ops for processing at the instruction decoder 228. In another embodiment, an instruction for a packed string comparison algorithm can be stored within the microcode ROM 232 should a number of micro-ops be needed to accomplish the operation. The trace cache 230 refers to a entry point programmable logic array (PLA) to determine a correct micro-instruction pointer for reading the micro-code sequences for the string comparison algorithm in the microcode ROM 232. After the microcode ROM 232 finishes sequencing micro-ops for the current macro-instruction, the front end 201 of the machine resumes fetching micro-ops from the trace cache 230.

Some SIMD and other multimedia types of instructions are considered complex instructions. Most floating point related instructions are also complex instructions. As such, when the instruction decoder 228 encounters a complex macro-instruction, the microcode ROM 232 is accessed at the appropriate location to retrieve the microcode sequence for that macro-instruction. The various micro-ops needed for performing that macro-instruction are communicated to the out-of-order execution engine 203 for execution at the appropriate integer and floating point execution units.

The out-of-order execution engine 203 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of this embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. In other embodiments, the integer and floating point registers may be located in the same register file. Each register file 208, 210, of this embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of this embodiment is comprised of a number of execution units: address generation unit (AGU) 212, AGU 214, fast ALU 216, fast ALU 218, slow ALU 220, floating point ALU 222, floating point move unit 224. For this embodiment, the floating point execution blocks 222, 224, execute floating point, MMX, SIMD, and SSE operations. The floating point ALU 222 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider. On the other hand, non-floating point numbers and integer type are handled with integer hardware resources. The simple, very frequent ALU operations go to the high-speed ALU execution units 216, 218. The fast ALUs 216, 218, of this embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For this embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In this embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for string comparison operations.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operated with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In this embodiment, in storing packed data and integer data, the registers do not need to differentiate between the two data types.

Figure 3A:
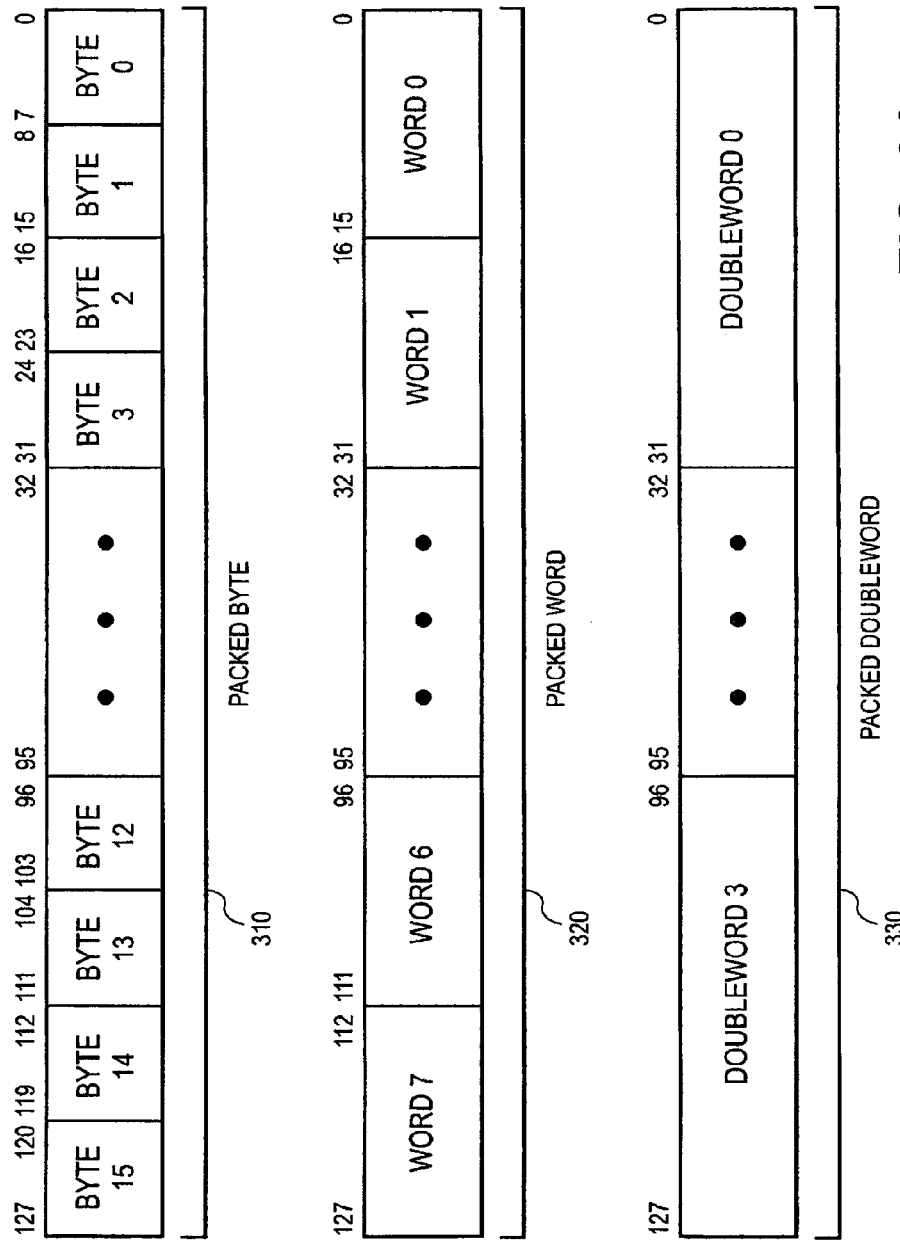
FIG. 3A illustrates various packed data type representations in multimedia registers according to one embodiment of the present invention.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 127 through bit 120 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
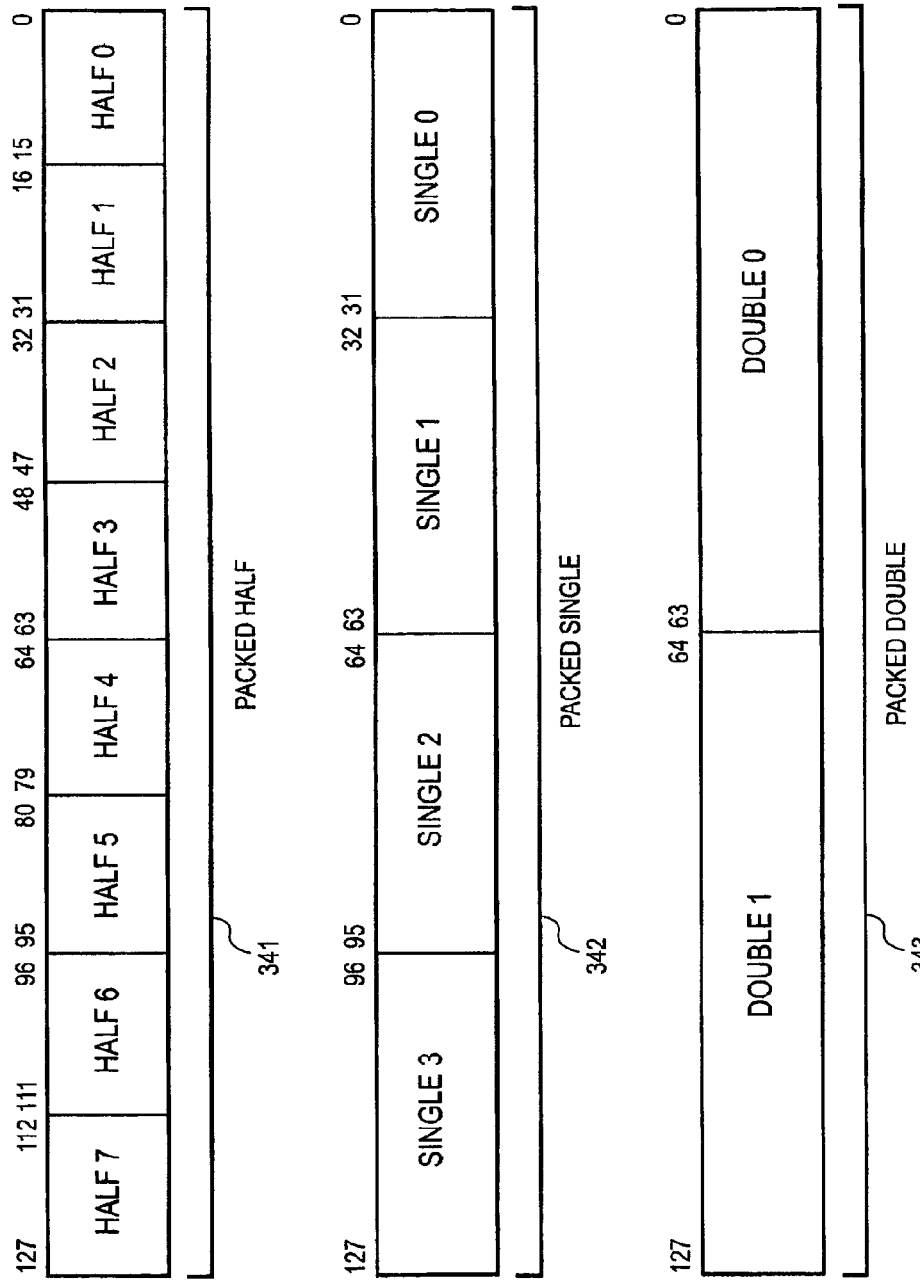
FIG. 3B illustrates packed data-types in accordance with an alternative embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty-seven through bit one hundred twenty for byte fifteen. Thus, all available bits are used in the register: This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element. In one embodiment, one or more operands may be constant and therefore do not change between instances of one or more instructions with which they are associated.

Figure 3D:
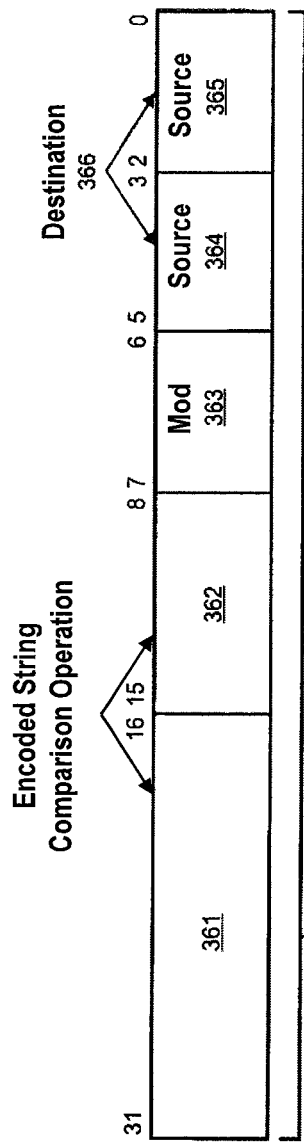

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, a string comparison operation may be encoded by one or more of fields 361 and 362. Up to two operand locations per instruction may be identified, including up to two source operand identifiers 364 and 365. For one embodiment of the string comparison instruction, destination operand identifier 366 is the same as source operand identifier 364, whereas in other embodiments they are different. For an alternative embodiment, destination operand identifier 366 is the same as source operand identifier 365, whereas in other embodiments they are different. In one embodiment of a string comparison instruction, one of the source operands identified by source operand identifiers 364 and 365 is overwritten by the results of the string comparison operations, whereas in other embodiments identifier 364 corresponds to a source register element and identifier 365 corresponds to a destination register element. For one embodiment of the string comparison instruction, operand identifiers 364 and 365 may be used to identify 32-bit or 64-bit source and destination operands.

Figure 3E:
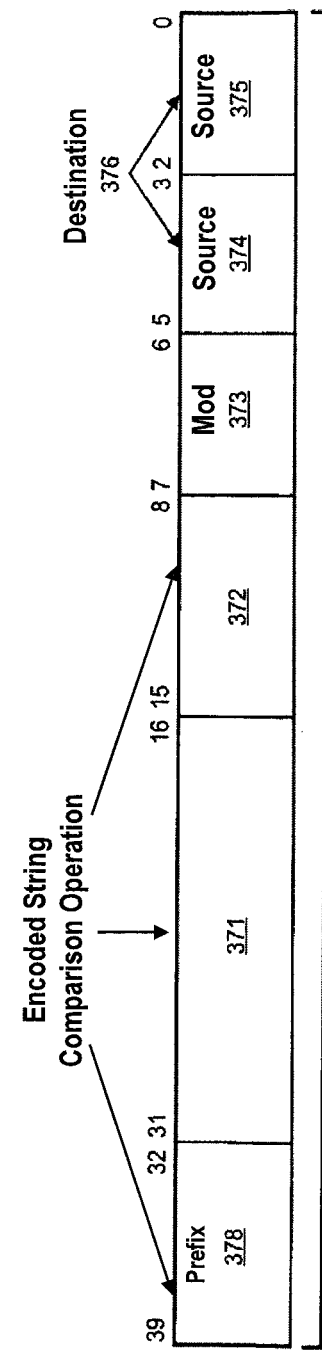
FIG. 3E illustrates an alternative operation encoding (opcode) format.

FIG. 3E is a depiction of another alternative operation encoding (opcode) format 370, having forty or more bits. Opcode format 370 corresponds with opcode format 360 and comprises an optional prefix byte 378. The type of string comparison operation may be encoded by one or more of fields 378, 371, and 372. Up to two operand locations per instruction may be identified by source operand identifiers 374 and 375 and by prefix byte 378. For one embodiment of the string comparison instruction, prefix byte 378 may be used to identify 32-bit, 64-bit, or 128-bit source and destination operands. For one embodiment of the string comparison instruction, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, the string comparison operations compare each element of one of the operands identified by operand identifiers 374 and 375 to each element of another operand identified by the operand identifiers 374 and 375 is overwritten by the results of the string comparison operations, whereas in other embodiments the string comparison of the operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments of string comparison operations, may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, the string comparison operation is performed on integer data elements. In some embodiments, a string comparison instruction may be executed conditionally, using condition field 381. For some string comparison instructions source data sizes may be encoded by field 383. In some embodiments of string comparison instruction, Zero (Z), negative (N), carry (C), and overflow (V) detection can be done on SIMD fields. For some instructions, the type of saturation may be encoded by field 384.

In one embodiment, fields, or "flags", may be used to indicate when a result of a string comparison operation is non-zero. In some embodiments, other fields may be used, such flags to indicate when a source element is invalid, as well as flags to indicate a least or most significant bit of a result of the string comparison operation.

Figure 4:
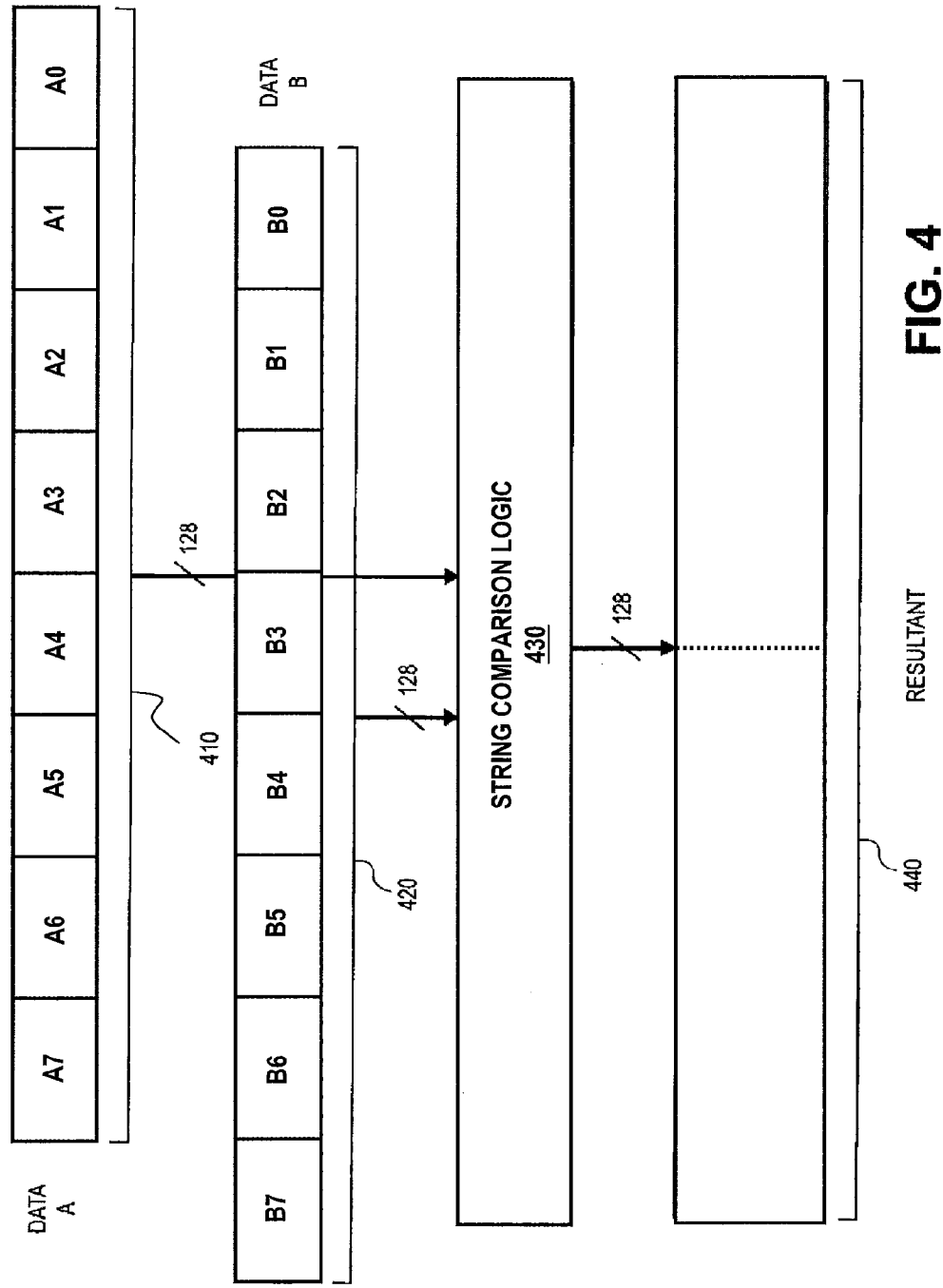
FIG. 4 is a block diagram of a logic to perform at least one string comparison operation on one or more single precision packed data operands in accordance with one embodiment of the present invention.

FIG. 4 is a block diagram of one embodiment of logic to perform a string comparison operation on packed data operands in accordance with the present invention. Embodiments of the present invention can be implemented to function with various types of operands such as those described above. For one implementation, string comparison operations in accordance to the present invention are implemented as a set of instructions to operate on specific data types. For instance, a packed string comparison instruction is provided to perform a comparison of 32-bit data types, including integer and floating point. Similarly, a packed string comparison instruction is provided to perform a comparison of 64-bit data types, including integer and floating point. The following discussions and examples below are to illustrate the operation of a comparison instruction to compare data elements, regardless of what the elements represent. For simplicity, some examples will illustrate the operation of one or more string comparison instructions, wherein the data elements represent text words.

In one embodiment, a string comparison instruction compares each element of a first data operand DATA A 410 with each element of a second data operand DATA B 420, and the result of each comparison stored in a RESULTANT 440 register. For the following discussions, DATA A, DATA B, and RESULTANT are generally referred to as registers, but not restricted as such, and also include registers, register files, and memory locations. In one embodiment, a text string compare instruction (e.g., "PCMPxSTRy") is decoded into one micro-operation. In an alternative embodiment, each instruction may be decoded into a various number of micro-ops to perform the text string compare operation on the data operands. For this example, the operands 410, 420, are 128 bit wide pieces of information stored in a source register/memory having word wide data elements. In one embodiment, the operands 410, 420, are held in 128 bit long SIMD registers, such as 128 bit SSEx XMM registers. For one embodiment, the RESULTANT 440 is also a XMM data register. In other embodiments, RESULTANT 440 may be a different type of register, such as an extended register (e.g., "EAX"), or a memory location. Depending on the particular implementation, the operands and registers can be other lengths such as 32, 64, and 256 bits, and have byte, doubleword, or quadword sized data elements. Although the data elements of this example are word size, the same concept can be extended to byte and doubleword sized elements. In one embodiment, where the data operands are 64 bit wide, MMX registers are used in place of the XMM registers.

In one embodiment, the first operand 410 is comprised of a set of eight data elements: A7, A6, A5, A4, A3, A2, A1, and A0. Each comparison between elements of the first and second operands may correspond to a data element position in the resultant 440. In one embodiment, the second operand 420 is comprised of another set of eight data segments: B7, B6, B5, B4, B3, B2, B1, and B0. The data segments here are of equal length and each comprise of a single word (16 bits) of data. However, data elements and data element positions can possess other granularities other than words. If each data element was a byte (8 bits), doubleword (32 bits), or a quadword (64 bits), the 128 bit operands would have sixteen byte wide, four doubleword wide, or two quadword wide data elements, respectively. Embodiments of the present invention are not restricted to particular length data operands or data segments, and can be sized appropriately for each implementation.

The operands 410, 420, can reside either in a register or a memory location or a register file or a mix. The data operands 410, 420, are sent to the string comparison logic 430 of an execution unit in the processor along with a text string compare instruction. By the time the instruction reaches the execution unit, the instruction may have been decoded earlier in the processor pipeline, in one embodiment. Thus the string comparison instruction can be in the form of a micro operation (uop) or some other decoded format. For one embodiment, the two data operands 410, 420, are received at string comparison logic 430. In one embodiment, the text-string comparison logic generates an indication of whether elements of two data operands are equal. In one embodiment, only valid elements of each operand are compared, which may be indicated by another register or memory location for each element in each operand. In one embodiment, each element of operand 410 is compared with each element of operand 420, which may generate a number of comparison results equal to the number of elements of operand 410 multiplied by the number elements of operand 420. In the case of each operand 410 and 420 being 32 bit values, for example, the resultant register 440 will store up to 4×4 result indicators of the text comparison operation performed by string comparison logic 430. In one embodiment, the data elements from the first and second operands are single precision (e.g., 32 bit), whereas in other embodiments, the data elements from the first and second operands are double precision (e.g., 64 bit). Still, in other embodiments, the first and second operands may include integer elements of any size, including 8, 16, and 32 bits.

For one embodiment, the data elements for all of the data positions are processed in parallel. In another embodiment, a certain portion of the data element positions can be processed together at a time. In one embodiment, the resultant 440 is comprised of multiple results of the comparisons made between each of the data elements stored in operands 410 and 420. Specifically, in one embodiment the resultant may store a number of comparison results equal to the square of the number of data elements in one of the operands 410 or 420.

In one embodiment, the resultant may store comparison results for only comparisons made between valid data elements of the operands 410 and 420. In one embodiment, the data elements of each operand may be explicitly or implicitly indicated to be valid. For example, in one embodiment each operand data element corresponds to a validity indicator, such as a valid bit, stored within another storage area, such as a valid register. In one embodiment, validity bits for each element of both operands may be stored in the same valid register, whereas in other embodiments, validity bits for one operand may be stored in a first valid register and the validity bits for the other operand may be stored in a second valid register. Before the operand data elements are compared, or in conjunction, a determination may be made as to whether both data elements are valid (for example by checking the corresponding valid bits), such that comparisons are only made between valid data elements.

In one embodiment, valid data elements in each operand may be implicitly indicated by the use of null or "zero" fields stored within one or both of the operands. For example, in one embodiment a null byte (or other size) may be stored in an element to indicate that all more significant data elements than the null byte are invalid, whereas all less significant data elements than the null byte are valid and therefore should be compared to the corresponding valid data elements of the other operand. Furthermore, in one embodiment, valid data elements of one operand may be explicitly indicated (as described earlier), whereas the valid data elements of the other operand may be implicitly indicated using null fields. In one embodiment, valid data elements are indicated by a count corresponding to the number of valid data elements or sub-elements within one or more source operands.

Regardless of the method in which valid data elements of each operand are indicated, at least one embodiment only compares the data elements of each operand that are indicated to be valid. Comparing only valid data elements may be performed in a number of ways in various embodiments. For the purpose of providing a thorough and understandable description, the method by which only valid data elements are compared between two text string operands may be best conceptualized by the following. However, the following description is merely one example of how best to conceptualize or implement comparing only valid data elements of text string operands. In other embodiments, other conceptualizations or methods may be used to illustrate how valid data elements are compared.

Regardless of whether the number of valid data elements in the operands is explicitly indicated (e.g., via valid bits in a validity register or by a count of the number of valid bytes/words starting from the least significant) or implicitly indicated (e.g., via null characters within the operands themselves), in one embodiment, only the valid data elements of each operand are compared with each other. In one embodiment, an aggregation of the validity indicators and the data elements to be compared may be conceptualized in FIG. 5.

Figure 5:
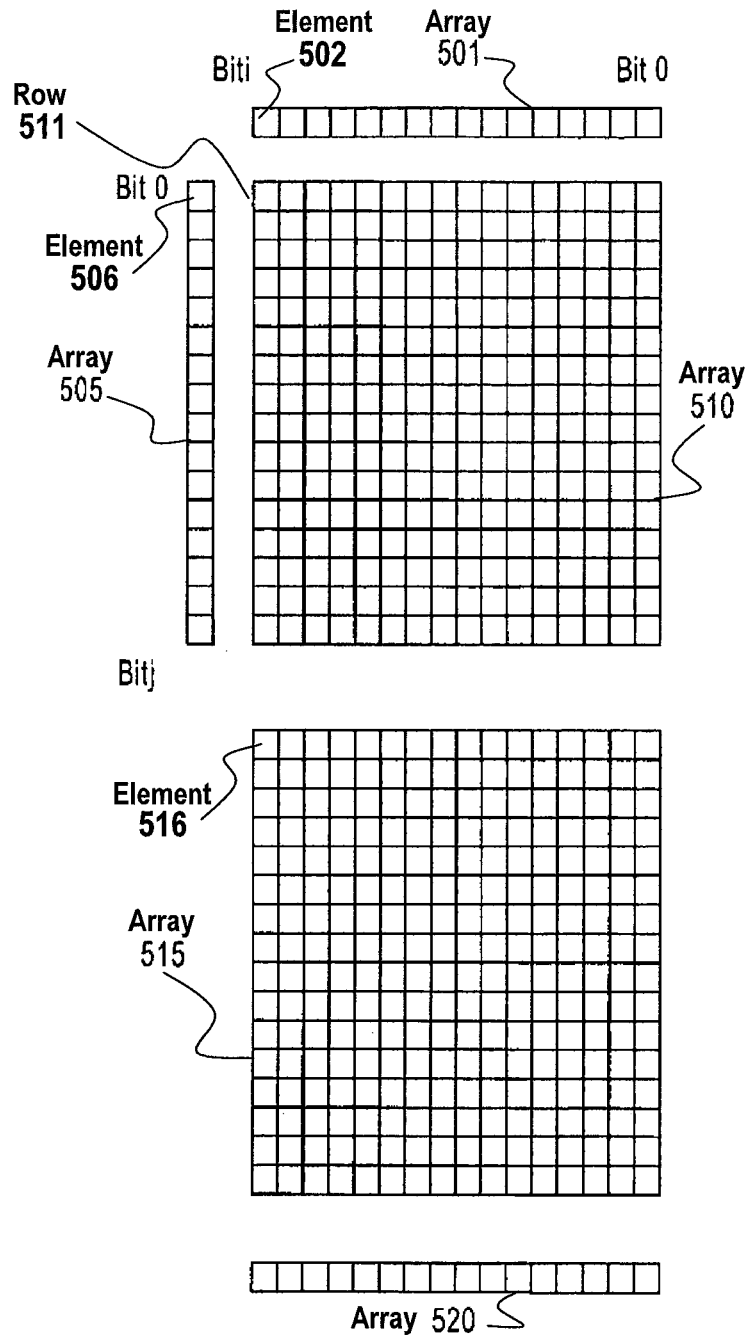
FIG. 5 is a block diagram of arrays that may be used to perform at least one string comparison operation according to one embodiment.

Referring to FIG. 5, in one embodiment, the arrays 501 and 505 contain entries which indicate whether each of the elements of a first operand and a second operand, respectively, are valid. For example, in the above illustration, the array 501 array may contain a "1" in each array element for which a first operand contains a corresponding valid data element. Similarly, array 505 may contain a "1" in each array element for which a second operand contains a corresponding valid data element. In one embodiment, the arrays 501 and 505 may contain ones starting in array element zero for each valid element present in each of two respective operands. For example, if a first operand contains four valid elements, array 501 may contain ones only in the first four array elements and all other array elements of array 501 may be zeros, in one embodiment.

In one embodiment, the arrays 501 and 505 are each 16 elements in size to represent 16 data elements of two 128 bit operands, each 8 bits (1 byte) in size. In other embodiments, in which the data elements of the operands are 16 bit (1 word) in size, arrays 501 and 505 may contain only 8 elements. In other embodiments, arrays 501 and 505 may be larger or smaller depending on the size of the operands to which they correspond.

In one embodiment, each data element of a first operand is compared to each data element of a second operand, the result of which may be represented by an i×j array 510. For example, a first data element of a first operand, representing a text string, for example, may be compared to each data element in another operand, representing another text string, and a "1" stored in each array element within the first row of the array 510 corresponding to a match between the first data element of the first operand and each of the data elements of the second operand. This may be repeated for each data element in the first operand until the array 510 is completed.

In one embodiment, a second array 515 of i×j entries may be generated to store indications of whether only valid operand data elements are equal. For example, in one embodiment, an entry of the top row 511 of array 510 may be logically AND'ed with the corresponding valid array element 506 and valid array element 502, and the result placed in the corresponding element 516 of array 515. The AND operation may be completed between each element of array 510 and the corresponding elements in valid arrays 501 and 505, and the result placed in the corresponding element of array 520.

In one embodiment, the result array 520 may indicate the presence of data elements in one operand which have relationships to one or more data elements in the other operand. For example, result array 520 may store bits to indicate whether there are any data elements which are within any of a set of ranges defined by data elements in the other operand, by AND'ing pairs of elements from array 515 and OK'ing all of the results from the AND'ing.

FIG. 5 also illustrates a result array 520 to store various indicators pertaining to the comparison between data elements of at least two packed operands. For example, result array 520 may store bits to indicate whether there are any equal data elements between the two operands, by OK'ing the corresponding elements of the array 515. If any of the array elements of array 515 contains a "1", for example, indicating that a match exists between valid data elements of the operands, then this may be reflected in result array 520, whose elements may also be OR'ed to determine if any valid data elements of the operands are equal.

In one embodiment, a contiguous string of valid matches between the data elements of two operands is detected within the result array 520 by detecting adjacent "1" values within the array. In one embodiment, this may be accomplished by AND'ing at two contiguous result array elements at a time and AND'ing the result of one AND operation with the next result entry until a "0" is detected. In other embodiments, other logic may be used to detect a range of valid matches of data elements within two packed operands.

In one embodiment, the result array 520 may indicate whether each data element of both operands match by returning a "1", for example, in the corresponding result array entry. In order to determine whether all of the entries are equal, an XOR operation may be performed on the result array entries. In other embodiments, other logic may be used to determine whether each of valid data element of two operands are equal.

In one embodiment, the presence of a string of data elements somewhere within another string of data elements may be detected by comparing a test string with equal sized portions of the other string and indicating a match between the test string and the portion of the other string within the result array. For example, in one embodiment, a test string of three characters corresponding to three data elements in a first operand are compared with a first set of three data elements of a second string. If a match is detected, the match may be reflected in the result array by storing one or more "1" values in one or more of the groups of three result entries corresponding to a match. The test string may then be compared against the next three data elements of the other operand, or it may compare two of the previous operand data elements and a new third data element with the test string, such that the test string 'slides' along the other operand as it compares.

In one embodiment, the entries of the result array may be inverted, or negated, depending upon the application. In other embodiments, only some of the result entries may be negated, such as only the ones that are indicated to correspond to valid matches between data elements of two operands. In other embodiments, other operations may be performed on the result entries of result array 520. For example, in some embodiments, the result array 520 may be represented as a mask value, whereas in other embodiments, the result array may be represented with an index value, which may be stored into a storage location, such as a register. In one embodiment, an index may be represented by a group of most-significant bits of the result array, whereas in other embodiments the index may be represented by a group of least-significant bits of the array. In one embodiment, the index may be represented by an offset value to the least or most significant bit that is set. In one embodiment, the mask may be zero extended, whereas in other embodiments, it may be a byte/word mask, or some other granularity.

Figure 6:
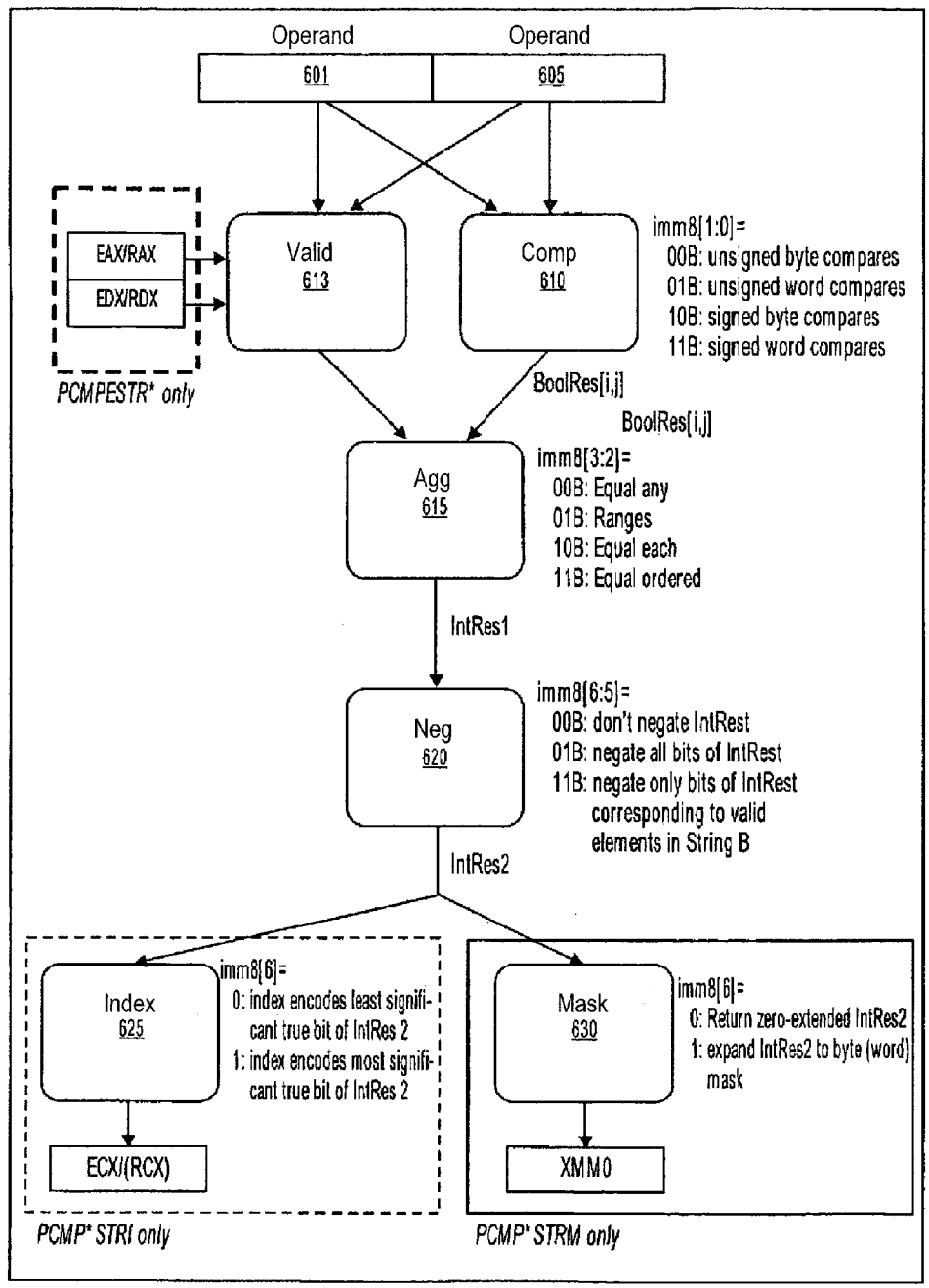
FIG. 6 illustrates operations that may be performed in one embodiment of the invention.

In various embodiments, each variance described above in comparing each element of two or more SIMD operands may be performed as separate individual instructions. In other embodiments, the variances described above may be performed by altering attributes of a single instruction, such as immediate fields associated with an instruction. FIG. 6 illustrates various operations performed by one or more instructions to compare each data element of two or more SIMD operands. In one embodiment, the operands compared by the operations in FIG. 6 each represent a text string. In other embodiments, the operands may represent some other information or data.

Referring to FIG. 6, each element of a first SIMD operand 601 and a second SIMD operand 605 may be compared to each other at operation 610. In one embodiment, one operand may be stored in a register, such as an XMM register, whereas the other operand may be stored in another XMM register or in memory. In one embodiment, the type of comparison may be controlled by an immediate field corresponding to an instruction performing the operations illustrated in FIG. 6. For example, in one embodiment, two bits of an immediate-field (e.g., IMM8[1:0]) may be used to indicate whether the data elements to be compared are signed bytes, signed words, unsigned bytes, or unsigned words. In one embodiment, the result of the comparison may generate an i×j array (e.g., BoolRes[i,j]) or some portion of an i×j array.

In parallel, the end of each string represented by operands 601 and 605 is found and the validity of each element of operand 601 and 605 may be determined at operation 613. In one embodiment, the validity of each element of operands 601 and 605 is indicated explicitly by setting a corresponding bit or bits within a register or memory location. In one embodiment, the bit or bits may correspond to the number of consecutive valid data elements (e.g., bytes) starting from the least significant bit position of the operand 601 and 605. For example, a register, such as an EAX or RAX register, may be used to store bits indicating the validity of each data element of the first operand, depending on the size of the operand. Similarly, a register, such as an EDX or RDX, may be used to store bits indicating the validity of each data element of the second operand, depending on the size of the operand. In another embodiment, the validity of each element of operands 601 and 605 may be implicitly indicated through means already discussed in this disclosure.

In one embodiment, the comparison and validity information may be combined by an aggregation function at operation 615 to produce some result of comparing the elements of the two operands. In one embodiment, the aggregation function is determined by an immediate field associated with an instruction to perform the comparison of the elements of the two operands. For example, in one embodiment, the immediate field may indicate whether the comparison is to indicate whether any of the data elements of the two operands are equal, whether any ranges (continuous or non-continuous) of data elements in the two operands are equal, whether each data element of the two operands are equal, or whether the operands share an equal ordering of at least some data elements.

The result of the aggregation function (stored in IntRes1 array, for example) may be negated, in one embodiment, at operation 620. In one embodiment, bits of an immediate field (e.g., IMM8[6:5]) may control the type of negating function to be performed on the aggregation function result. For example, immediate fields may indicate that the aggregation results are not to be negated at all, that all results of the aggregation function are to be negated, or that only aggregation results corresponding to valid elements of the operands are to be negated. In one embodiment, the result of the negating operation may be stored into an array (e.g., IntRes2 array).

The result array generated by the negating operation may be converted into an index or a mask value, in one embodiment at operations 625 and 630, respectively. If the negating operation result is converted into an index, bits of an immediate field (e.g., IMM8[6]) may control whether the most significant bit(s) or the least significant bit(s) of the result of the comparison is/are encoded into an index, the result of which may be stored into a register (e.g., ECX or RCX). If the result of the negating operation is to be represented with a mask value in one embodiment, bits of an immediate field (e.g., IMM8[6]) may be used to control whether the mask is to be zero-extended or expanded to a byte (or word) mask.

Thus, techniques for performing a string compare operation are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor, comprising:
   a cache having a plurality of cache levels including a level 1 (L1) cache;
   a plurality of address generation units (AGUs);
   a plurality of arithmetic logic units (ALUs);
   a plurality of floating point (FP) units;
   instruction fetch logic to fetch one or more instructions;
   instruction decode logic to decode the one or more instructions;
   out-of-order logic to perform out-of-order execution of the one or more instructions;
   a register file including a set of 128-bit packed data registers to store packed single-precision floating point (SPFP) data elements and packed integer data elements;
   register renaming logic to rename logical registers to physical storage locations within the register file; and
   a plurality of execution units to execute:
   a first compare instruction to compare a first plurality of packed unsigned integer data elements stored in a first packed data register with a second plurality of packed unsigned integer data elements stored in a second packed data register, and to store a plurality of first result data elements in a third packed data register, wherein the plurality of first result data elements are expanded mask data elements, each of a first multi-bit size, to represent results of the comparison between the first packed unsigned integer data elements and the second packed unsigned integer data elements, each of the plurality of first result data elements to indicate whether the corresponding first packed unsigned integer data elements and the second packed unsigned integer data elements are equal,
   a second compare instruction to compare a first plurality of packed signed integer data elements stored in a fourth packed data register with a second plurality of packed signed integer data elements stored in a fifth packed data register, and to store a plurality of second result data elements in a sixth packed data register, wherein the plurality of second result data elements are expanded mask data elements, each of a second multi-bit size, to represent results of the comparison between the first packed signed integer data elements and the second packed signed integer data elements, and a third compare instruction to compare a first plurality of packed single precision floating point (SPFP) data elements stored in a seventh packed data register with a second plurality of packed SPFP data elements stored in an eighth packed data register, and to store a plurality of third result data elements in a ninth packed data register to represent results of the comparison between the first packed SPFP data elements and the second packed SPFP data elements, each of the third result data elements stored in the ninth packed data register to indicate whether the corresponding first packed SPFP data elements and the second packed SPFP data elements are equal.

2. The processor as in claim 1, wherein each of the first and second data elements includes 8 bits.

3. The processor as in claim 1, wherein each of the first and second data elements includes 16 bits.

4. The processor as in claim 1, wherein each of the first and second data elements includes 32 bits.

5. The processor as in claim 1, wherein both the first and the second multi-bit sizes are 8 bits.

6. The processor as in claim 5, wherein whether said first and second result data elements are expanded mask data elements is controlled by one or more bits of an immediate field corresponding to the first and the second compare instruction, respectively.

7. The processor as in claim 1, wherein the first multi-bit size is 8 bits and the second multi-bit size is 16 bits.

8. The processor as in claim 7, wherein whether said first and second multi-bit sizes are 8 bits or 16 bits is controlled by one or more bits of an immediate field corresponding to the first and the second compare instruction, respectively.

9. The processor as in claim 8, wherein whether said first and second pluralities of packed integer data elements are signed or unsigned is controlled by the said or more bits of the immediate field corresponding to the first and the second compare instruction, respectively.

10. A processing system comprising:
a first memory to store one or more instructions including a single-instruction-multiple-data (SIMD) compare instruction; and
a processor comprising:
instruction decode logic to decode the one or more instructions including the SIMD compare instruction;
out-of-order logic to perform out-of-order execution of the one or more instructions including the SIMD compare instruction;
a register file including a set of 128-bit packed data registers to store packed data elements;
register renaming logic to rename logical registers to physical storage locations within the register file; and
one or more execution units, responsive to the SIMD compare instruction, to compare a first plurality of packed data elements stored in a first packed data register with a second plurality of packed data elements stored in a second packed data register, and to store a plurality of result data elements in at least a third register, wherein the plurality of result data elements are to be stored in one or more form selected from the group consisting of: expanded mask data elements, each of a first multi-bit size; one-bit mask data elements in a 128-bit zero-extended mask; an index to a most significant true result data element; and an index to a least significant true result data element; and wherein the plurality of result data elements represent results of the comparison between the first packed data elements and the second packed data elements, each of the plurality of result data elements to indicate whether the corresponding first packed data elements and the second packed data elements are equal.

11. The processing system as in claim 10, wherein the third register is one of the set of 128-bit packed data registers.

12. The processing system as in claim 10, wherein the third register is one of a set of 32-bit general purpose registers.

13. The processing system as in claim 10, wherein the third register is one of a set of 64-bit general purpose registers.

14. The processing system as in claim 10, wherein the first multi-bit size is 8 bits.

15. The processing system as in claim 10, wherein the first multi-bit size is 16 bits.

16. The processing system as in claim 10, wherein whether said one or more form selected for storing the result data elements includes expanded mask data elements is controlled by one or more bits of an immediate field corresponding to the SIMD compare instruction.

17. The processing system as in claim 10, wherein whether said one or more form selected for storing the result data elements includes one-bit mask data elements in a 128-bit zero-extended mask is controlled by one or more bits of an immediate field corresponding to the SIMD compare instruction.

18. The processing system as in claim 10, wherein whether said one or more form selected for storing the result data elements includes an index to a most significant true result data element or to a least significant true result data element is controlled by one or more bits of an immediate field corresponding to the SIMD compare instruction.

19. The processing system as in claim 10, wherein whether said first and second pluralities of packed data elements are signed or unsigned is controlled by one or more bits of the immediate field corresponding to the SIMD compare instruction.

20. The processing system as in claim 10, wherein whether said first and second pluralities of packed data elements are bytes or words is controlled by one or more bits of the immediate field corresponding to the SIMD compare instruction.

* * * * *